(12) United States Patent
Grethel et al.

(10) Patent No.: US 7,707,911 B2
(45) Date of Patent: May 4, 2010

(54) HYDRAULIC CONTROL FOR A DUAL CLUTCH TRANSMISSION

(75) Inventors: Marco Grethel, Buehlertal (DE);
Manfred Homm, Buehl-Neusatz (DE);
Eric Mueller, Kaiserslautern (DE);
Martin Staudinger, Ettlingen (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 12/437,854

(22) Filed: May 8, 2009

(65) Prior Publication Data

US 2009/0215585 A1    Aug. 27, 2009

Related U.S. Application Data

(63) Continuation of application No. PCT/DE2007/001877, filed on Oct. 22, 2007.

(30) Foreign Application Priority Data

Nov. 8, 2006    (DE) .................. 10 2006 052 641

(51) Int. Cl.
*F16H 47/00* (2006.01)
(52) U.S. Cl. ................. 74/730.1; 192/3.57; 192/70.12; 192/87.13
(58) Field of Classification Search .............. 74/340, 74/346, 335, 730.1; 475/116, 128, 120; 192/3.57, 192/3.58, 3.61, 3.63, 87.13, 70.12, 113.34
See application file for complete search history.

(56) References Cited

U.S. PATENT DOCUMENTS

| 4,077,502 | A | * | 3/1978 | Nitsche et al. ............. 192/3.23 |
| 5,415,603 | A | | 5/1995 | Tuzuki et al. |
| 6,199,441 | B1 | * | 3/2001 | Kanenobu et al. ............. 74/331 |
| 6,427,550 | B1 | | 8/2002 | Bowen |
| 6,951,526 | B2 | * | 10/2005 | Kuhstrebe et al. ............. 477/97 |
| 2001/0010027 | A1 | | 7/2001 | Takano et al. |
| 2005/0064975 | A1 | | 3/2005 | Takagi et al. |
| 2005/0252326 | A1 | * | 11/2005 | Mueller et al. ................. 74/335 |
| 2009/0321209 | A1 | * | 12/2009 | Grethel et al. ........... 192/70.12 |

FOREIGN PATENT DOCUMENTS

| DE | 2005 019 516 Y | 12/2005 |
| DE | 10 2004 031 021 | 1/2006 |
| EP | 1 544 513 | 6/2005 |

* cited by examiner

*Primary Examiner*—David D Le
(74) *Attorney, Agent, or Firm*—Lucas & Mercanti, LLP

(57) ABSTRACT

A dual clutch transmission which has a first clutch, actuated by a first hydraulic cylinder, a second clutch, actuated by a second hydraulic cylinder, shift devices for shifting gears, which are actuated by respective hydraulically operated cylinders, and a hydraulic energy source for supplying the hydraulic cylinders and the hydraulically operated cylinders with hydraulic energy. The hydraulic energy source has a first pump, a second pump and an electric drive driving the second pump.

15 Claims, 1 Drawing Sheet

HYDRAULIC CONTROL FOR A DUAL CLUTCH TRANSMISSION

This application is a 371 of PCT/DE2007/001877 filed Oct. 22, 2007, which in turn claims the priority of DE 10 2006 052 641.4 filed Nov. 08, 2006, the priority of both applications is hereby claimed and both applications are incorporated by reference herein.

BACKGROUND OF THE IVENTION

The invention relates to a dual clutch transmission comprising a first clutch which is actuated by a first hydraulic cylinder, a second clutch which is actuated by a second hydraulic cylinder, a plurality of shift devices for shifting gears which are actuated by one respective hydraulic cylinder, and comprising a hydraulic energy source for supplying the hydraulic cylinders and the hydraulically operated cylinders with hydraulic energy.

It is known to shift shifting gears, in particular dual clutch transmissions, hydraulically, as well as to actuate the two clutches hydraulically.

It is the object of the invention to provide an advanced dual clutch transmission, adapted in particular to the requirements of advanced drive engineering.

SUMMARY OF THE INVENTION

The object is achieved by a dual clutch transmission comprising a first clutch which is actuated by a first hydraulic cylinder, a second clutch which is actuated by a second hydraulic cylinder, a plurality of shift devices for shifting gears which are actuated by one respective hydraulic cylinder, and comprising a hydraulic energy source for supplying the hydraulic cylinders and the hydraulically operated cylinders with hydraulic energy, in that the hydraulic energy source comprises a first pump, a second pump and an electric drive driving the second pump. Thus it is advantageously possible to drive, for example, the first pump by means of an internal combustion engine shifted by the dual clutch transmission, i.e. to take the hydraulic energy from the drive train of the internal combustion engine. In order to continue to have hydraulic energy available when the internal combustion engine is switched off, in such cases the second electrically driven pump may apply the hydraulic energy necessary for actuating the dual clutch transmission. This may be utilized advantageously for implementing a stop-start function.

The object is further achieved by a dual clutch transmission comprising a first clutch which is actuated by a first hydraulic cylinder, a second clutch which is actuated by a second hydraulic cylinder, a plurality of shift devices for shifting gears which are actuated by one respective hydraulic cylinder, and comprising a hydraulic energy source for supplying the hydraulic cylinders and the hydraulically operated cylinders with hydraulic energy, in that a third clutch is provided which is actuated by a third hydraulic cylinder. The third clutch may, for example, connect an electric motor to the conventional drive train of the internal combustion engine. As a result, by means of the third clutch it is possible to produce a hybrid drive with the internal combustion engine and the electric motor. Moreover, it is conceivable to connect any other unit via the third clutch, for example a second internal combustion engine, or to disconnect any other unit from the drive train.

The object is further achieved by a dual clutch transmission comprising a first clutch which is actuated by a first hydraulic cylinder, a second clutch which is actuated by a second hydraulic cylinder, a plurality of shift devices for shifting gears which are actuated by one respective hydraulic cylinder, and comprising a hydraulic energy source for supplying the hydraulic cylinders and the hydraulically operated cylinders with hydraulic energy, in that a cooling oil device is provided for cooling the first, second and/or third clutch. Advantageously, by means of the cooling oil device the wear may be minimized and the maximum transmittable torque of the clutch and/or the clutches may be increased.

The object is further achieved by a dual clutch transmission comprising a first clutch which is actuated by a first hydraulic cylinder, a second clutch which is actuated by a second hydraulic cylinder, a plurality of shift devices for shifting gears which are actuated by one respective hydraulic cylinder, and comprising a hydraulic energy source for supplying the hydraulic cylinders and the hydraulically operated cylinders with hydraulic energy, in that a total of five shift devices are provided. The shift devices are coupled to the corresponding hydraulic cylinders and are used for engaging the various gears of the dual clutch transmission. For this purpose, the shift devices may comprise gear shift forks coupled to the hydraulic cylinders, which in turn are associated with corresponding gear shift rods of the dual clutch transmission. Advantageously, any number of gears may be shifted, for example up to ten gears or more.

Preferred exemplary embodiments are characterized in that the first pump is connected in parallel with the second pump. Advantageously, both the first pump and the second pump may supply the dual clutch transmission with hydraulic energy, respectively individually or in parallel operation.

Further preferred exemplary embodiments are characterized in that a first check valve is arranged downstream of the first pump and a second check valve is arranged downstream of the second pump. The check valves can advantageously prevent a return flow of hydraulic medium, for example if one of the pumps is switched off.

Further preferred embodiments are characterized in that the cooling oil device comprises an oil cooler arranged downstream of the pumps. As a result, the hydraulic medium delivered from the first and/or second pump can be cooled.

Further preferred embodiments are characterized in that between the hydraulic energy source and the oil cooler a branch is connected for diverting a cooling oil volume flow. By means of the branch, therefore, a cooling oil volume flow can be diverted from the hydraulic medium. As a result, the hydraulic energy source can equally supply both the oil cooler and the remaining hydraulic system of the dual clutch transmission with a corresponding medium, for example suitable cooling medium and/or hydraulic medium.

Further preferred exemplary embodiments are characterized in that the cooling oil device comprises a suction jet pump for increasing the diverted cooling oil volume flow. Advantageously, the volume flow of the diverted cooling oil may increase by means of the suction jet pump which delivers from a tank of the hydraulic system. To this end, the suction jet pump can relieve the medium delivered from the hydraulic energy source, from the relatively high operating pressure to a pressure close to the tank pressure, which is sufficient for supplying the clutches to be cooled with the cooling oil. As a result, advantageously the energy stored in the form of operating pressure in the hydraulic medium is utilized for increasing the cooling oil volume flow or for delivering the entire cooling oil volume flow. The otherwise useless energy released in the form of heat when the cooling oil is relieved, may thus advantageously be converted by means of the suction jet pump into kinetic energy of the increased cooling oil volume flow.

Further preferred exemplary embodiments are characterized in that the suction jet pump is arranged downstream of the oil cooler. As a result, it is thus possible by means of the suction jet pump to mix the cooled cooling oil with fresh oil originating from the tank and to supply said oil to the clutches for cooling.

Further preferred exemplary embodiments are characterized in that a safety valve block is provided, which in a safety position cuts off the hydraulic energy source from the first and second hydraulic cylinders and shifts said hydraulic cylinders in an unpressurized manner, in particular connecting said hydraulic cylinders to the tank. Advantageously, with disruption which possibly occurs when shifting the dual clutch transmission, by shifting the corresponding hydraulic cylinders in an unpressurized manner the first and second clutches can immediately be opened. As a result, even in the event of faulty shifting which could possibly lead to a locking of the transmission, by opening the clutches arranged downstream at least damage from the remaining components can be avoided and also locking of drive wheels, for example of a motor vehicle, arranged downstream of the dual clutch transmission, can be avoided.

Further preferred exemplary embodiments are characterized in that the hydraulic cylinders and the hydraulically operated cylinders comprise path sensors for detecting the current cylinder position. Advantageously, the path sensors can provide information required for controlling and/or adjusting the dual clutch transmission. Moreover, expensive pressure sensors which are possibly required may be dispensed with.

Further preferred exemplary embodiments are characterized in that for the hydraulic activation of the first hydraulic cylinder, a first pressure reduction unit is provided; for the activation of the second hydraulic cylinder, a second pressure reduction unit is provided; and for the activation of the third hydraulic cylinder, a third pressure reduction unit is provided. Via the pressure reduction units, the corresponding hydraulic cylinders of the clutches may be supplied with hydraulic energy, respectively individually and in a metered manner. As a result, via the pressure reduction units it is possible to control a smooth engagement and/or disengagement of the clutches.

Further preferred exemplary embodiments are characterized in that for the activation, one respective hydraulic control valve is associated with each of the pressure reduction units. The control and/or adjustment of the dual clutch transmission may thus take place hydraulically by means of the hydraulic control valves.

Further preferred exemplary embodiments are characterized in that for the hydraulic activation of the hydraulic cylinders an on-off valve arrangement is provided. The on-off valve arrangement undertakes the entire hydraulic control of the hydraulic cylinders. As a result, by a corresponding adjustment of the on-off valve arrangement any gear of the dual clutch transmission may be set and/or selected. To this end, the on-off valve arrangement may comprise, for example, a plurality of hydraulic sliding valves. Moreover, the on-off valve arrangement may comprise a rotary disk valve.

BRIEF DESCRIPTION OF THE DRAWINGS

Further advantages, features and details emerge from the following description in which an exemplary embodiment is described in detail with reference to the drawings, in which.

DETAILED DESCRIPTION OF THE INVENTION

Figure 1:
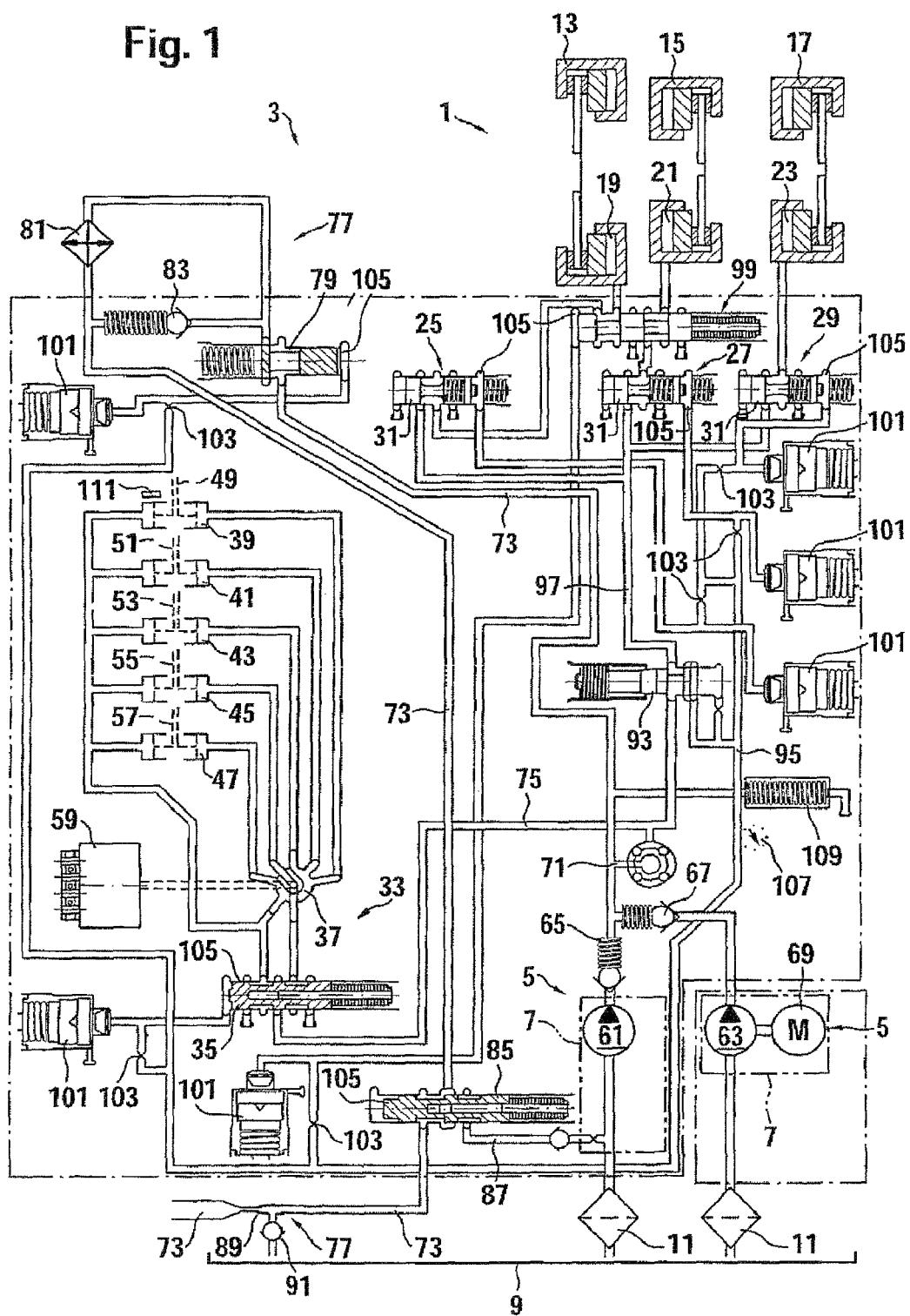
FIG. 1 shows a hydraulic diagram of a hydraulic system for controlling a dual clutch transmission.

FIG. 1 shows schematically the hydraulic circuit diagram of a dual clutch transmission 1 or a hydraulic system 3 for the hydraulic activation of the dual clutch transmission 1.

The hydraulic system 3 of the dual clutch transmission 1 has a hydraulic energy source 5. The hydraulic energy source 5 is indicated by means of a dash-dotted line 7 and is used for supplying the hydraulic system 3 which is arranged downstream with hydraulic energy. The hydraulic energy source 5 is fed from a tank 9 with a suitable hydraulic medium in the known manner. Between the tank 9 and the hydraulic energy source 5 one or more suction filters 11 may be connected for cleaning the hydraulic medium.

The dual clutch transmission 1 has a first clutch 13, a second clutch 15 and a third clutch 17. The clutches 13 to 17 are able to be actuated by means of the hydraulic system 3. Additionally, the first clutch 13 has a first hydraulic cylinder 19, the second clutch 15 a second hydraulic cylinder 21 and the third clutch 17 a third hydraulic cylinder 23, which respectively may be activated by a first pressure reduction unit 25, a second pressure reduction unit 27 and a third pressure reduction unit 29 of the hydraulic system 3.

The pressure reduction units 25 to 29 respectively have an adjusting piston 31, a linear displacement of the adjusting piston 31 proportionally thereto effecting the supply of hydraulic energy delivered from the hydraulic energy source 5 to the corresponding hydraulic cylinders 19 to 23 of the clutches 13 to 17 arranged downstream. In this case, the clutches 13 to 17 are designed such that an increase in the pressure in the corresponding hydraulic cylinders 19 to 23 effects a closure of the respective clutch 13 to 17. The clutches 13 to 17 are thus open in the unpressurized state. A reverse design, however, is also possible, in which at least one or all clutches 13 to 17 are closed in the unpressurized state.

For setting the gears of the dual clutch transmission 1, the hydraulic system 3 has an on-off valve arrangement 33. The on-off valve arrangement 33 is also supplied with hydraulic energy by means of the hydraulic energy source 5, and is used for activating hydraulic cylinders of the dual clutch transmission 1.

In FIG. 1, the on-off valve arrangement has a reversing valve 35 as well as a rotary disk valve 37 arranged downstream therefrom. A first hydraulic cylinder 39, a second hydraulic cylinder 41, a third hydraulic cylinder 43, a fourth hydraulic cylinder 45 and a fifth hydraulic cylinder 47 are associated with the rotary disk valve 37. The first hydraulic cylinder 39 controls a first shift device 49, for example, designed for engaging the reverse gear. The second hydraulic cylinder 41 controls a second shift device 51, for example, for engaging the first or third gear of the dual clutch transmission 1. The third hydraulic cylinder 43 controls a third shift device 53, for example, designed for engaging the second or fourth gear of the dual clutch transmission 1. The fourth hydraulic cylinder 45 controls a fourth shift device 55, for example, designed for engaging the fifth or seventh gear. The fifth hydraulic cylinder 47 controls a fifth shift device 57, for example, designed for engaging the sixth or eighth gear of the dual clutch transmission 1. To this end, the hydraulic cylinders 39 to 47 are respectively designed to be double-acting, thus having two respective opposing surfaces which may be acted upon by pressure. It is also possible to activate the gear shift rods respectively by individual hydraulic cylinders acting in a correspondingly opposing manner. The rotary disk valve 37 may, by means of a stepping motor 59, be moved in a total of five different shifting positions. Additionally, the rotary disk valve 37 may have a neutral position. In this case, in each of the shifting positions only one of the hydraulic cylinders 39 to 47—in the alignment of FIG. 1—is connected on the right-hand side to an outlet of the reversing valve 35. On the left-hand side, irrespective of the shifting position of the rotary disk valve 37, all hydraulic cylinders 39 to 47 are associated with a further outlet of the reversing valve.

In FIG. 1 the rotary disk valve 37 is shown in a fourth shifting position, the fourth shift device 55 and/or the associated fourth hydraulic cylinder 45 being connected hydraulically to the reversing valve 35 so that the fourth hydraulic cylinder 45, viewed in the alignment of FIG. 1, may be acted upon by pressure either from the left or from the right and on the respective opposing side may be connected to the tank 9. As a result, according to the shifting position of the reversing valve 35, the fifth or seventh gear of the dual clutch transmission 1 may be engaged.

The remaining hydraulic cylinders 39, 41, 43, 47 are locked on the right-hand side due to the rotary disk valve 37 which is closed for this purpose. According to the shifting position of the reversing valve 35, said hydraulic cylinders are locked either at a high pressure level, for example approximately at system pressure, or at a low pressure level, for example approximately at tank pressure. Thus it may also be ensured that a gear which is already engaged is not accidentally disengaged, for example, in particularly difficult driving conditions.

Moreover, the reversing valve 35 may be moved into a shifting position which is shown in FIG. 1, the entire fourth hydraulic cylinder 45 being shifted in an unpressurized manner, i.e. connected to the tank 9.

The shifting of the remaining gears takes place in a similar manner according to the shifting positions of the reversing valve 35 and of the rotary disk valve 37 arranged downstream. For changing the gear ratio, therefore, the corresponding gears of a desired gear pair may be successively engaged.

For shifting a greater or smaller number of gears, any number of gear shift rods as well as associated hydraulic cylinders may be additionally provided or omitted for the activation. To this end, the on-off valve arrangement 33 may also be modified accordingly and/or enlarged or reduced by the corresponding shifting capacity.

The hydraulic energy source 5 has a first pump 61 and a second pump 63 connected in parallel with the first pump 61. A first check valve 65 is arranged downstream of the first pump 61. A second check valve 67 is arranged downstream of the second pump 63. The first pump 61 may be driven by means of an internal combustion engine, not shown in more detail in FIG. 1. The hydraulic energy transmitted by means of the first pump 61 is thus taken from the drive train of the correspondingly connected internal combustion engine shifted by means of the dual clutch transmission 1. Advantageously, when the internal combustion engine is at rest, the second pump 63 is able to supply the hydraulic system 3 of the dual clutch transmission 1 with hydraulic energy, as the second pump 63 is coupled to an electric drive 69. The electric drive 69 drives the second pump 63 and may comprise, for example, an electric motor.

By means of the check valves 65 and 67 it is possible to operate the pumps 61 and 63 selectively individually or together for supplying the hydraulic system 3 with hydraulic energy.

A branch 71 is arranged downstream of the hydraulic energy source 5. The branch 71 diverts the medium supplied by the hydraulic energy source 5 into a cooling oil line 73 and a supply line 75.

The cooling oil line 73 is a component of a cooling oil device 77. The cooling oil device 77 is designed for cooling at least one of the clutches 13, 15 and/or 17 by acting upon the medium diverted via the cooling oil line 73. The cooling oil device 77 has a fourth pressure reduction unit 79 connected in the cooling oil line 73. The fourth pressure reduction unit 79 may control the cooling oil volume flow guided in the cooling oil line 73. Arranged downstream of the fourth pressure reduction unit 79, the cooling oil device 77 has an oil cooler 81 as well as a third check valve 83 connected in parallel with the oil cooler 81. The third check valve 83 is connected in parallel with the oil cooler 81 such that said third check valve opens when a specific dynamic pressure occurring on the oil cooler 81 is exceeded. Due to the changing viscosity of the cooling oil, which also occurs with a changing temperature, when the cooling oil is relatively cool the oil cooler 81 may as a result be bypassed via the third check valve 83. Only at higher temperatures, i.e. when cooling is required, does the third check valve 83 close. As a result, via the third check valve 83 an adjustment of the temperature of the cooling oil is possible to a certain extent. Moreover, as a result valuable hydraulic energy may be saved. In particular with cool cooling oil, the hydraulic resistance and as a result the occurring energy loss converted into heat may thus be reduced.

Arranged downstream of the oil cooler 81 and the third check valve 83, the cooling oil device 77 has a control valve 85. The control valve 85 may couple, i.e. to a certain extent short circuit, the cooling oil line 73 via a return line 87 directly to the first pump 61 and/or the tank 9. In this shifting position, no cooling oil reaches the clutches 13 to 17. Arranged downstream from the control valve 85, the cooling oil device 77 has a suction jet pump 89. Advantageously, the suction jet pump 89 may deliver additional medium from the tank 9 via a fourth check valve 91 for increasing the cooling oil volume flow. To this end, advantageously the energy stored via the pressure may be converted into a higher volume flow. As a result, the power loss of the hydraulic system 3 is reduced. Arranged downstream of the suction jet pump 89, and no longer shown in FIG. 1, via the cooling oil line 73 of the cooling oil device 77, the volume flow of cooling oil increased via the suction jet pump 89 may be supplied to at least one of the clutches 13 to 17 for cooling. In the exemplary embodiments with dry clutches 13 to 17, the cooling oil device 77 and/or the suction jet pump 89 may simply be dispensed with.

The supply line 75 feeds the reversing valve 35 of the on-off valve arrangement 33 with hydraulic energy.

Moreover, the supply line 75 is connected to a pilot pressure valve 93, relative to which a pilot control line 95 and a system line 97 are arranged downstream. The pilot pressure valve 93 generates a pilot pressure in the pilot control line 95 and a system pressure in the system line 97. The pressure reduction units 25 to 29 are arranged downstream of the system line 97. Between the first hydraulic cylinder 19 and the first pressure reduction unit 25 as well as between the second hydraulic cylinder 21 and the associated second pressure reduction unit 27, a safety valve block 99 is connected. In the shifting position, as shown in FIG. 1, the safety valve block 99 allows a direct connection of the hydraulic cylinders 19 and 21 to the associated pressure reduction units 25 and 27. As a result, in this position and by means of the pressure reduction units 25 and 27 the hydraulic cylinders 19 and 21 arranged downstream are activated. In a second shifting position of the safety valve block 99, said safety valve block may cut off the first and second pressure reduction units 25 and 27 and at the same time shift the first hydraulic cylinder 19 and the second hydraulic cylinder 21 in an unpressurized manner or connect said hydraulic cylinders to the tank 9. It may be seen that in this second shifting position firstly no hydraulic energy at all can be supplied to the hydraulic cylinders 19 and 21, and secondly pressure which has possibly built up may be immediately relieved via the tank 9, which leads to an immediate opening of the associated first clutch 13 and the second clutch 15. Advantageously, therefore, for example in the case of an undesirable but perceived faulty shifting of the dual clutch transmission 1, the first and second clutch 13 and 15 are opened by means of the safety valve block 99. The third clutch 17 may be a hybrid clutch for coupling a further unit, for example an electric motor. This unit is thus not shifted via the dual clutch transmission 1, and therefore in the case of a fault in the dual clutch transmission 1 does not have to be drained as rapidly as possible via the safety valve block 99. It is, however, also possible to shift the third clutch 17 in a similar manner to the remaining clutch 13 and 15.

The control and/or adjustment of the hydraulic system 3 of the first dual clutch transmission 1 takes place entirely hydraulically by means of corresponding, for example electrically actuatable, hydraulic control valves 101. The control valves 101 are arranged in the known manner via throttles 103 downstream of the pilot control line 95, coupled downstream to the tank 9, and connected upstream to corresponding control pistons 105 of the valves of the hydraulic system 3. The pressure reduction units 25 to 29 have, for example, pressure reducing valves controlled via such control valves 101 configured, for example, as proportional valves. For measuring the pilot control pressure in the pilot control line 95 the hydraulic system 3 of the dual clutch transmission 1 comprises a pressure measuring device 107. For limiting the system pressure, the hydraulic system 3 has a pressure limiting valve 109 connected downstream to the tank 9. The hydraulic cylinders 19, 21, 23 and the hydraulically operated cylinders 39, 41, 43, 45, 47 may comprise path sensors 111 for detecting the current cylinder position. In FIG. 1, by way of example, a path sensor 111 is indicated on the hydraulic cylinder 39.

LIST OF REFERENCE NUMERALS

1. Dual clutch transmission
3. Hydraulic system
5. Hydraulic energy source
7. Line
9. Tank
11. Suction filter
13. First clutch
15. Second clutch
17. Third clutch
19. First hydraulic cylinder
21. Second hydraulic cylinder
23. Third hydraulic cylinder
25. First pressure reduction unit
27. Second pressure reduction unit
29. Third pressure reduction unit
31. Adjusting piston
33. On-off valve arrangement
35. Reversing valve
37. Rotary disk valve
39. First hydraulic cylinder
41. Second hydraulic cylinder
43. Third hydraulic cylinder
45. Fourth hydraulic cylinder
47. Fifth hydraulic cylinder
49. First shift device
51. Second shift device
53. Third shift device
55. Fourth shift device
57. Fifth shift device
59. Stepping motor
61. First pump
63. Second pump
65. First check valve
67. Second check valve
69. Electric drive
71. Branch
73. Cooling oil line
75. Supply line
77. Cooling oil device
79. Fourth pressure reduction unit
81. Oil cooler
83. Third check valve
85. Control valve
87. Return line
89. Suction jet pump
91. Fourth check valve
93. Pilot pressure valve
95. Pilot control line
97. System line
99. Safety valve block
101. Control valve
103. Throttle
105. Control piston
107. Pressure measuring device
109. Pressure limiting valve
111. Path sensor

The invention claimed is:

1. A dual clutch transmission, comprising:
a first clutch which is actuated by a first hydraulic cylinder;
a second clutch which is actuated by a second hydraulic cylinder;
a plurality of shift devices for shifting gears, each of which are actuated by a hydraulically operated cylinder; and
a hydraulic energy source for supplying the first hydraulic cylinder, the second hydraulic cylinder and each hydraulically operated cylinder for the plurality of shifting devices with hydraulic energy,
wherein the hydraulic energy source has a first pump, a second pump and an electric drive driving only the second pump, and a line from the second pump is only connected to a line from the first pump, and
wherein a first check valve is arranged in the line directly downstream of the first pump and a second check valve is arranged in the line downstream of the second pump, directly before a connection of the line from the second pump and the line from the first pump.

2. The dual clutch transmission as claimed in claim 1, wherein a safety valve block is provided, which, in a safety shifting position, cuts off the hydraulic energy source from the first hydraulic cylinder and the second hydraulic cylinder, such that the first hydraulic cylinder and the second hydraulic cylinder are unpressurized and shifts the first hydraulic cylinder and the second hydraulic cylinder, connecting the first hydraulic cylinder and the second hydraulic cylinder to a tank.

3. The dual clutch transmission as claimed in claim 1, wherein the first hydraulic cylinder, the second hydraulic cylinder and a third hydraulic cylinder and the hydraulically operated cylinders have path sensors for detecting current cylinder position.

4. The dual clutch transmission as in claim 1, wherein the plurality of shift devices is five shifting devices.

5. The dual clutch transmission as claimed in claim 1, wherein the first pump is connected in parallel with the second pump.

6. The dual clutch transmission as claimed in claim 1, wherein a cooling oil device is provided for cooling the first clutch and the second clutch.

7. The dual clutch transmission as claimed in claim 6, wherein the cooling oil device has an oil cooler arranged downstream of the hydraulic energy source.

8. The dual clutch transmission as claimed in claim 7, wherein, between the hydraulic energy source and the oil cooler, a branch is connected for diverting a cooling oil volume flow.

9. The dual clutch transmission as claimed in claim 7, wherein the cooling oil device has a suction jet pump for increasing diverted cooling oil volume flow.

10. The dual clutch transmission as claimed in claim 9, wherein the suction jet pump is arranged downstream of the oil cooler.

11. The dual clutch transmission as claimed in claim 1, wherein a third clutch is actuated by a third hydraulic cylinder, and the hydraulic energy source supplies the third hydraulic cylinder with the hydraulic energy.

12. The dual clutch transmission as claimed in claim 11, wherein a cooling oil device is provided for cooling the third clutch.

13. The dual clutch transmission as claimed in claim 1, wherein, for hydraulic activation of the first hydraulic cylinder, a first pressure reduction unit is provided, for the hydraulic activation of the second hydraulic cylinder, a second pressure reduction unit is provided and for the hydraulic activation of the third hydraulic cylinder, a third pressure reduction unit is provided.

14. The dual clutch transmission as claimed in claim 13, wherein, for the hydraulic activation, the first pressure reduction unit, the second pressure reduction unit and the third pressure reduction unit are each associated with a corresponding hydraulic control valve.

15. The dual clutch transmission as claimed in claim 13, wherein, tor the hydraulic activation of the hydraulic cylinders, an on-off valve arrangement is provided.

* * * * *